(12) United States Patent
Niska et al.

(10) Patent No.: US 7,672,272 B2
(45) Date of Patent: Mar. 2, 2010

(54) FRAME SIZE ADAPTATION IN REAL-TIME TRANSPORT PROTOCOL

(75) Inventors: Hakan Niska, Linkoping (SE); Tomas Nylander, Stavsnas (SE); Jari Tapio Vikberg, Jarna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1533 days.

(21) Appl. No.: 10/969,375

(22) Filed: Oct. 20, 2004

(65) Prior Publication Data

US 2006/0045073 A1 Mar. 2, 2006

Related U.S. Application Data

(60) Provisional application No. 60/606,044, filed on Aug. 31, 2004.

(51) Int. Cl.
*H04Q 7/00* (2006.01)
(52) U.S. Cl. .............. 370/329; 455/436; 455/414.1; 455/456.1; 455/526; 455/458; 455/432.1; 455/445; 455/439; 455/459; 455/435.1; 370/328; 370/338; 370/340; 370/352; 370/310; 370/252; 370/401; 370/319; 370/341
(58) Field of Classification Search ............... 455/436, 455/414.1, 526.1, 432.2, 445, 439, 435.2, 455/458, 122.1; 370/328, 338, 340, 352, 370/310, 252, 401, 329, 341; 709/233, 235
See application file for complete search history.

(56) References Cited

U.S. PATENT DOCUMENTS 5,850,388 A * 12/1998 Anderson et al. .......... 370/252
6,856,613 B1 2/2005 Murphy
7,127,250 B2 * 10/2006 Gallagher et al. .......... 455/436
2001/0023454 A1 * 9/2001 Fitzgerald .................. 709/233
2003/0137959 A1 * 7/2003 Nebiker et al. ............. 370/338
2004/0116120 A1 * 6/2004 Gallagher et al. .......... 455/436
2004/0243662 A1 * 12/2004 Mastro ....................... 709/200
2005/0101329 A1 * 5/2005 Gallagher ................... 455/436
2005/0122922 A1 * 6/2005 Wu et al. .................... 370/310
2005/0181805 A1 * 8/2005 Gallagher ................ 455/456.1
2005/0186948 A1 * 8/2005 Gallagher et al. ........ 455/414.1
2005/0265279 A1 * 12/2005 Markovic et al. .......... 370/328
2006/0274706 A1 * 12/2006 Chen et al. ................. 370/340
2007/0025301 A1 * 2/2007 Petersson et al. ........... 370/338

FOREIGN PATENT DOCUMENTS

EP 0942560 A2 9/1999
EP 1513304 A2 3/2005

* cited by examiner

*Primary Examiner*—Rafael Pérez-Gutiérrez
*Assistant Examiner*—Joseph Arevalo (57) ABSTRACT

A system and method in an unlicensed-radio access network for transporting a circuit-switched payload between an access network controller and a mobile station utilizing a packet-based transmission protocol. The controller sends to the mobile station, a channel activation message that includes a minimum acceptable sample size of the circuit-switched payload to be included in each packet. The mobile station determines whether it can support communications utilizing the minimum acceptable sample size, and if not, selects a larger sample size. The mobile station may send an acknowledgment message that indicates the sample size to be utilized. Alternatively, the mobile station begins transmitting packets, and the controller analyzes received packets to determine the sample size the mobile station is using. The controller then encodes transmissions to the mobile station utilizing the determined sample size.

13 Claims, 7 Drawing Sheets

| IEI | Information Element | Type/Reference | Presence | Format | Length | Value | Notes |
|---|---|---|---|---|---|---|---|
| | Length Indicator | Length Indicator 11.1.1.1 | M | V | 2 | | |
| | UMA RR Protocol Discriminator | Protocol Discriminator 11.1.1.2 | M | V | 1/2 | 0001 | |
| | Skip Indicator | Skip Indicator 11.1.1.3 | M | V | 1/2 | 0000 | |
| | URR ACTIVATE CHANNEL message identity | Message Type 11.1.1.4 | M | V | 1 | | |
| 27 | Channel Mode | Channel Mode 11.2.27 | M | TLV | 3 | | |
| 53 | Sample Size | Sample Size 11.2.53 | M | TLV | 3 | | CS payload sample size in ms |
| 97 | IP Address | IP Address 11.2.9 | M | TLV | 6 | | |
| 104 | RTP UDP Port | Communication Port 11.2.25 | M | TLV | 4 | | |
| 54 | Payload Type | Payload Type 11.2.54 | O | TLV | 3 | | |
| 55 | Multi-rate Configuration | Multi-rate Configuration 11.2.55 | C | TLV | 3-n | | |
| 105 | RTCP UDP Port | Communication Port 11.2.25 | O | TLV | 4 | | |

```
Sample Size (octet 3)

20    20 ms of CS payload included in each RTP/UDP packet
   40    40 ms of CS payload included in each RTP/UDP packet
   60    60 ms of CS payload included in each RTP/UDP packet
   80    80 ms of CS payload included in each RTP/UDP packet All other values are undefined in Release 1.
```

FRAME SIZE ADAPTATION IN REAL-TIME TRANSPORT PROTOCOL

RELATED APPLICATIONS

This application claims priority on U.S. Provisional Application No. 60/606,044, entitled, Frame Size Adaptation in Real-Time Transport Protocol, filed Aug. 31, 2004.

FIELD OF THE INVENTION

The present invention relates to the transmission of synchronized data, such as voice data, over an IP network. In particular, and not by way of limitation, the invention is directed to a system and method for adapting circuit-switched (CS) payload transport between a mobile station and an unlicensed-radio access network utilizing the Real-Time Transport Protocol (RTP).

BACKGROUND ART

When voice data is transported over an IP network, the chosen transport protocol is generally the Real-Time Transport Protocol (RTP). This protocol is conventionally used to transport different kinds of synchronized media, such as video or voice coded with different codecs. RTP is carried over the User Datagram Protocol (UDP). For this reason, the end points of an active voice session using RTP are generally identified using an IP address, i.e. network address, and a UDP port or transport level identifier. The use of RTP enables one or more speech samples to be carried in one RTP package.

The Unlicensed Radio service utilizes an unlicensed radio band to support mobile telecommunication systems operating in licensed radio bands. For example, the Unlicensed Radio service may support Global System for Mobile Communications (GSM) circuit-switched services and GSM Packet Radio Service (GPRS) packet-switched services.

A packet-switched voice session is set-up using a signaling protocol, such as the Session Initiation Protocol (SIP), H-323 or another proprietary or standard protocol. During set-up of the voice session, each party signals to the other party the identifiers that have been locally selected for the voice session.

When a circuit switched call (speech or data) is set up, the network controller specifies the number of speech/data frames that must be used in each RTP package. This is specified as the sample size for the RTP package (which can be converted to a number of 20 ms voice/data samples). If the MS cannot support this requirement, the MS cannot proceed, and the call is terminated.

This problem can be avoided by specifying that a greater number of speech/data frames be used in each RTP package. This enables less capable MSs to proceed with call setup. A disadvantage is that the greater number of speech/data frames in each RTP package increases the delay in the transmission between the MS and the network controller. Thus, the system must be set up either for low delay (some MSs cannot be served) or for higher delay (high performance MSs unnecessarily have higher round trip delay).

It would be advantageous to have a system and method that overcomes the disadvantages of the existing methodology. The present invention provides such a system and method.

SUMMARY OF THE INVENTION

The present invention individually serves MSs with different capabilities by adapting the circuit-switched (CS) payload transport between each individual MS and the unlicensed-radio access network controller. This is done by negotiating the number of speech/data frames per RTP package during the assignment of a traffic channel. In essence, the MS selects the closest sample size that the MS can support and uses the selected sample size in RTP packets that it sends to the network controller. The network controller checks the received RTP packets and automatically adopts the sample size utilized by the MS.

Thus, in one aspect, the present invention is directed to a method of adapting circuit-switched payload transport between a mobile station and an unlicensed-radio access network controller utilizing a packet-based transmission protocol. The method includes the steps of receiving in the mobile station, a channel activation message from the access network controller that includes a minimum acceptable sample size of the circuit-switched payload to be included in each packet; determining whether the mobile station is capable of supporting communications utilizing the minimum acceptable sample size; and if so, transmitting packets to the controller utilizing the minimum acceptable sample size to transport the circuit-switched payload. If the mobile station is not capable of supporting communications utilizing the minimum acceptable sample size, the mobile station transmits packets to the controller utilizing a selected larger sample size to transport the circuit-switched payload. The controller analyzes the packets received from the mobile station to determine the sample size utilized by the mobile station, and automatically transmits packets to the mobile station utilizing the determined sample size.

In another aspect, the present invention is directed to a method of adapting circuit-switched payload transport between a mobile station and an unlicensed-radio access network controller utilizing a packet-based transmission protocol. The method includes the steps of receiving in the mobile station, a channel activation message from the access network controller, the channel activation message including a minimum acceptable sample size of the circuit-switched payload to be included in each packet; and determining whether the mobile station is capable of supporting communications utilizing the minimum acceptable sample size. If so, the mobile station sends an acknowledgment message to the access network controller accepting the minimum acceptable sample size as the sample size to be utilized by the controller for transmissions to the mobile station. If the mobile station is not capable of supporting communications utilizing the minimum acceptable sample size, the mobile station selects a larger sample size which the mobile station is capable of supporting, and sends an acknowledgment message to the access network controller specifying the selected larger sample size as the sample size to be utilized by the controller for transmissions to the mobile station.

In another aspect, the present invention is directed to a method of adapting circuit-switched payload transport between an unlicensed-radio access network controller and a mobile station utilizing a packet-based transmission protocol. The method includes the steps of sending from the access network controller to the mobile station, a channel activation message that includes a minimum acceptable sample size of the circuit-switched payload to be included in each packet; and receiving an acknowledgment message from the mobile station that accepts the minimum acceptable sample size as the sample size to be utilized by the controller for transmissions to the mobile station if the mobile station is capable of supporting communications utilizing the minimum acceptable sample size. Alternatively, the acknowledgment message may specify a larger sample size as the sample size to be utilized by the controller for transmissions to the mobile station if the mobile station is not capable of supporting communications utilizing the minimum acceptable sample size. The access network controller then encodes transmissions to the mobile station utilizing the sample size received in the acknowledgment message.

In yet another aspect, the present invention is directed to a mobile station for transporting a circuit-switched payload to and from an unlicensed-radio access network controller utilizing a packet-based transmission protocol. The mobile station includes a receiver that receives a channel activation message from the access network controller and extracts from the channel activation message, a minimum acceptable sample size of the circuit-switched payload to be included in each packet. A sample size analyzer in the mobile station receives the extracted minimum acceptable sample size from the receiver and determines whether the mobile station is capable of supporting communications utilizing the minimum acceptable sample size. A transmitter then sends to the access network controller, an acknowledgment message that includes a sample size that the mobile station can support. If the mobile station is capable of supporting communications utilizing the minimum acceptable sample size, the sample size analyzer sends an indication to the transmitter accepting the minimum acceptable sample size as the sample size to be included in the acknowledgment message. If the mobile station is not capable of supporting communications utilizing the minimum acceptable sample size, the sample size analyzer selects a larger sample size that the mobile station can support, and sends an indication to the transmitter of the selected larger sample size as the sample size to be included in the acknowledgment message.

In still yet another aspect, the present invention is directed to an unlicensed-radio access network controller for transporting a circuit-switched payload to and from a mobile station utilizing a packet-based transmission protocol. The access network controller includes a transmitter that sends to the mobile station, a channel activation message that includes a minimum acceptable sample size of the circuit-switched payload to be included in each packet. A receiver in the controller receives an acknowledgment message from the mobile station that includes a sample size that the mobile station can support. The controller also includes means for analyzing the acknowledgment message to determine whether the mobile station accepted the minimum acceptable sample size as the sample size to be utilized by the controller for transmissions to the mobile station, or whether the mobile station specified a larger sample size as the sample size to be utilized by the controller for transmissions to the mobile station. A codec then encodes transmissions to the mobile station utilizing the sample size received in the acknowledgment message.

The present invention is also directed to a system in an unlicensed-radio access network for transporting a circuit-switched payload utilizing a packet-based transmission protocol. The system includes an unlicensed-radio access network controller and a mobile station. The controller includes a transmitter that sends to the mobile station, a channel activation message that includes a minimum acceptable sample size of the circuit-switched payload to be included in each packet. The controller also includes a receiver that receives an acknowledgment message from the mobile station that includes a sample size that the mobile station can support; and a codec that encodes transmissions to the mobile station utilizing the sample size received in the acknowledgment message. The mobile station includes a receiver that receives the channel activation message from the access network controller and extracts from the channel activation message, the minimum acceptable sample size. A sample size analyzer in the mobile station receives the extracted minimum acceptable sample size from the receiver, and if the mobile station is not capable of supporting communications utilizing the minimum acceptable sample size, selects a larger sample size that the mobile station can support. The mobile station also includes a transmitter that sends to the access network controller, an acknowledgment message that includes a sample size that the mobile station can support.

BRIEF DESCRIPTION OF THE DRAWINGS

Further objects and advantages of the present invention will become apparent from the following description of the preferred embodiments that are given by way of example with reference to the accompanying drawings wherein.

DETAILED DESCRIPTION OF EMBODIMENTS

Figure 1:
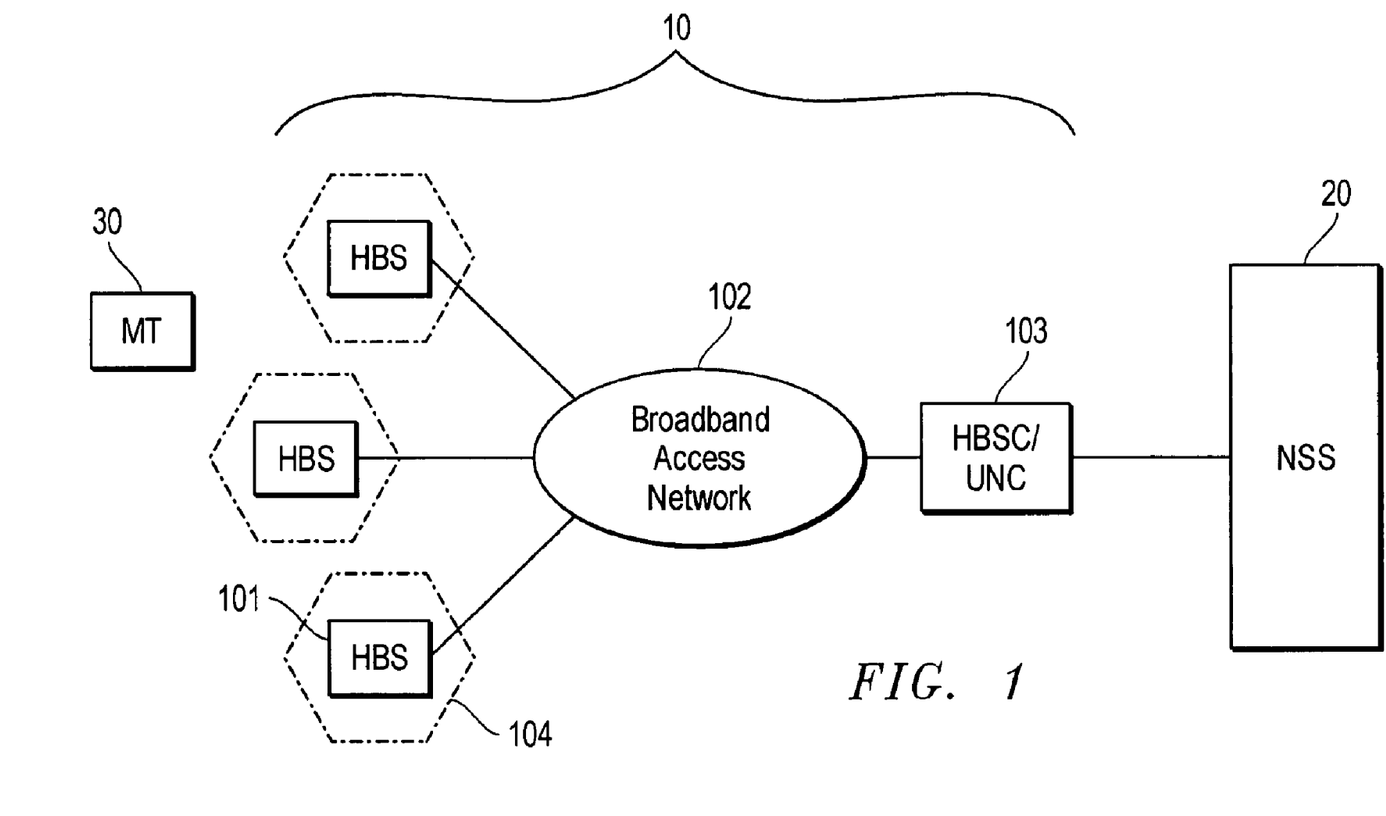
FIG. 1 is a simplified block diagram of an unlicensed-radio access network for a conventional cellular mobile communications network.

FIG. 1 is a simplified block diagram of an unlicensed-radio access network for a conventional cellular mobile communications network. The unlicensed-radio access network enables mobile stations to communicate with the core network portion of a conventional mobile communications network, such as a GSM network, and through this other communication networks, via an unlicensed-radio interface. The term "unlicensed-radio" means any radio protocol that does not require the operator running the mobile network to have obtained a license from the appropriate regulatory body. In general, such unlicensed-radio technologies must be low power and thus of limited range compared to licensed mobile radio services. A benefit of this lower power is that the battery lifetime of mobile stations is greater. Moreover, because the range is limited the unlicensed-radio may be a broadband radio, thus providing improved voice quality. The radio interface may utilize any suitable unlicensed-radio protocol, for example a wireless LAN protocol, Digital Enhanced Cordless Telecommunications (DECT), or Bluetooth radio.

The access network 10 comprises an access controller 103, hereinafter referred to as a home base station controller HBSC or an Unlicensed-radio Network Controller (UNC), which communicates with the core network portion of a conventional cellular mobile communications network NSS 20 over standard interfaces, such as the A- or Gb-interface for a GSM cellular network. The access controller 103 is connected to a plurality of access points 101 or home base stations HBS via a broadband packet-switched network 102.

The packet-switched network 102 may be a dedicated private network or part of an already existing network, preferably with access to the Internet that is connected to various other devices, nodes and possibly also access to other private and public networks. The home base stations HBS 103 are adapted to communicate across an unlicensed-radio interface with mobile stations 30 and to this end comprise radio transceivers that define a coverage area or cell 104 in a similar manner to the operation of a conventional base station transceiver.

The home base stations HBS 101 may be dedicated entities in the access network 10 that are registered with the home base station controller and are capable of establishing a connection with a mobile station 30 independently of a connection with the home base station controller HBSC 103. Alternatively, the home base stations may serve as access points to the unlicensed-radio access network 10 that are essentially transparent to both mobile stations 30 and the home base station controller HBSC 103. In this latter case, a mobile station 30 will establish a connection directly with the home base station controller HBSC 10 across the broadband packet-switched network 102 and vice versa. Both the home base station controller HBSC 103 and the home base stations HBS 101 have a network address on the broadband network. During the set up of a voice session between these two nodes, each node allocates a network address as the source address for receiving voice data and communicates this to the other node. This address is then conventionally used by the receiving node as the destination address for the synchronized data stream in the opposite direction.

The broadband packet-switched network 102 carries data between the various nodes, i.e. the home base stations 101 and the home base station controller 103 using the Internet Protocol IP. Voice data is carried over the network 102 using Real-Time Protocol RTP over User Datagram Protocol UDP over IP. RTP is commonly used on top of IP to transport different kinds of synchronized media data, such as video, voice coded using different codecs, or music. The network source address for the synchronized data in a voice session includes both an IP-address and UDP port, which is the transport level identifier.

Figure 2:
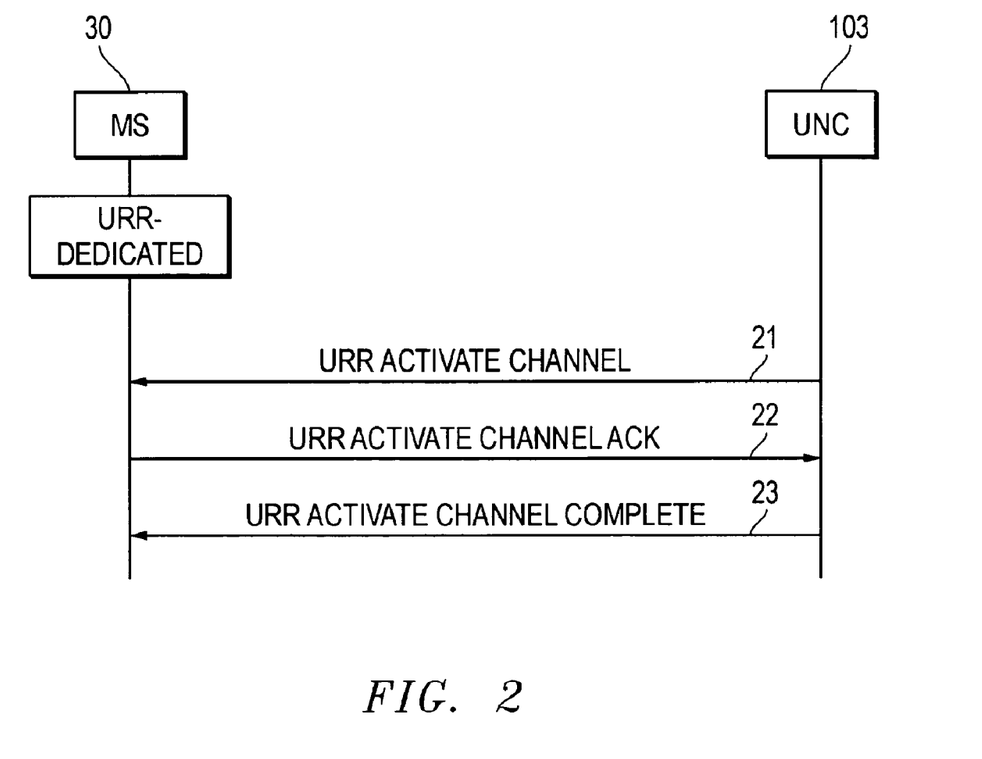
FIG. 2 is a signaling diagram showing the signaling messages sent between the MS and the Unlicensed Radio Network Controller (UNC) during traffic channel assignment.

FIG. 2 is a signaling diagram showing the signaling messages sent between an MS and an Unlicensed Radio Network Controller (UNC) during traffic channel assignment. The Channel Assignment procedure is always initiated by the network. Upon receiving an Assignment Request from a Mobile Switching Center (MSC) (not shown), the UNC configures a traffic channel by transmitting a URR ACTIVATE CHANNEL message 21 to a URR-dedicated MS 30. The URR ACTIVATE CHANNEL message can be sent to the MS only when the MS is in URR-DEDICATED state.

Figure 3:
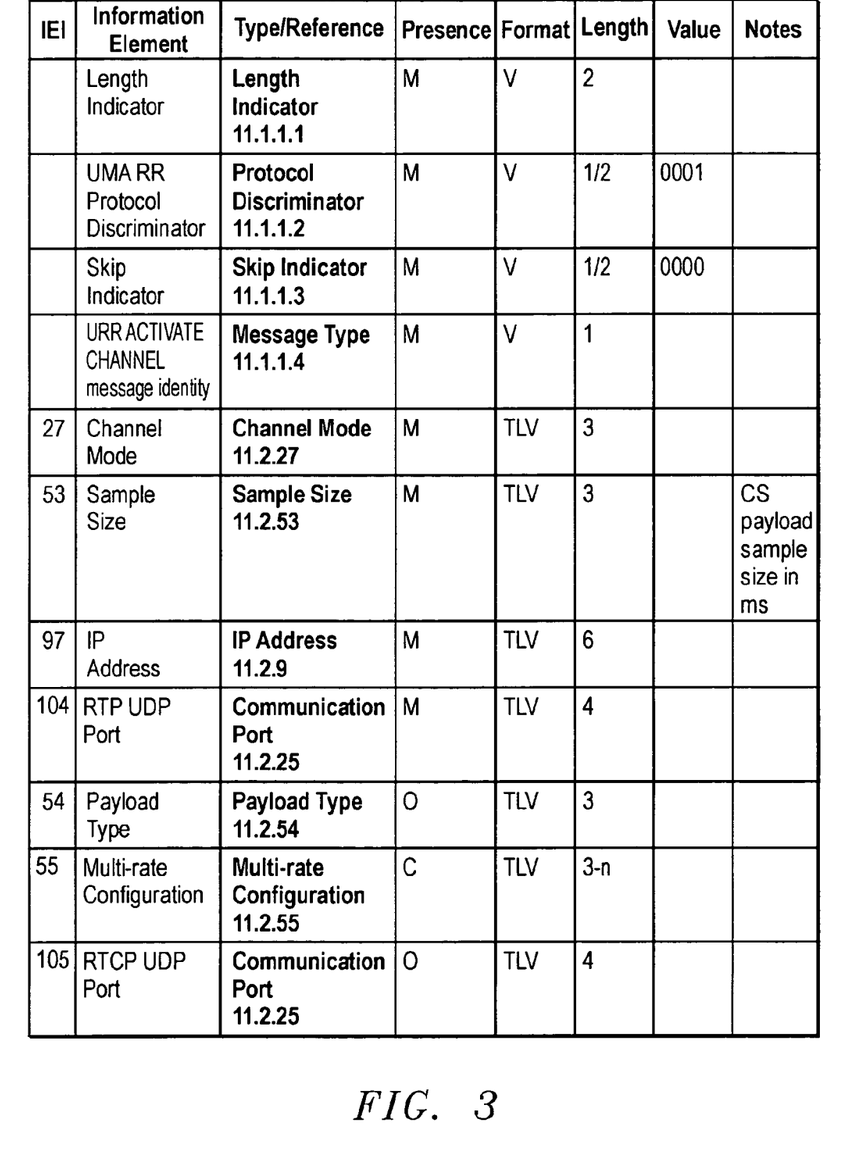
FIG. 3 is a chart showing the content of the URR ACTIVATE CHANNEL message.

FIG. 3 is a chart illustrating the various information elements (IEs) of the URR ACTIVATE CHANNEL message 21.

Referring to FIGS. 2 and 3, the remainder of the traffic channel assignment procedure will be described. Using existing RTP procedures, the URR-dedicated MS 30 responds to the received URR ACTIVATE CHANNEL message 21 as follows:

Code and decode the CS payload samples according to the IE "Channel Mode";
Use the value of the IE "Sample Size" as the sampling size for the coding and decoding of the CS payload samples;
Configure the uplink CS payload stream to be transmitted to the UDP port identified by the IE "UDP Port";
Configure the uplink CS payload stream to be transmitted to the IP address identified by the IE "IP address";

If received, use the configuration included in the IE 'Multi-rate Configuration' for the CS payload stream;
If received, use the Payload Type included in the IE 'Payload Type' for the PT field in the RTP header for the CS payload stream;
On successful activation of the channel:
Transmit a URR ACTIVATE CHANNEL ACK message 22 and include the UDP port number in the IE 'UDP Port" for the downlink CS payload stream to be used by the UNC; and
If the IE 'RTCP UDP Port' was received in the URR ACTIVATE CHANNEL message and the MS is capable of supporting RTCP, activate the uplink RTCP stream and include the IE 'RTCP UDP Port' for the downlink RTCP stream to be used by the UNC.

Thereafter, the UNC 103 configures itself for transmission of RTP packets to the MS 30. The UNC then transmits a URR ACTIVATE CHANNEL COMPLETE message 23 to the MS.

Figure 4:
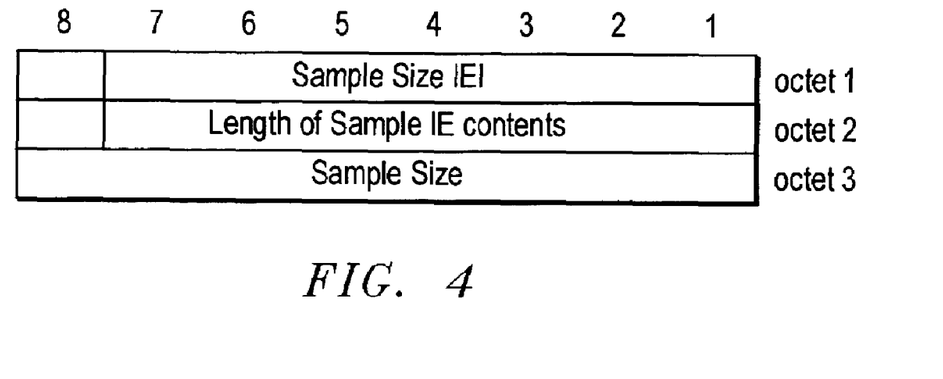
FIG. 4 is a chart of the Sample Size information element (IE)

FIG. 4 is a chart of the Sample Size information element (IE). The Sample Size IE is used by the network to indicate the size of the CS payload frames to be included in each RTP/UDP packet.

Figure 5:
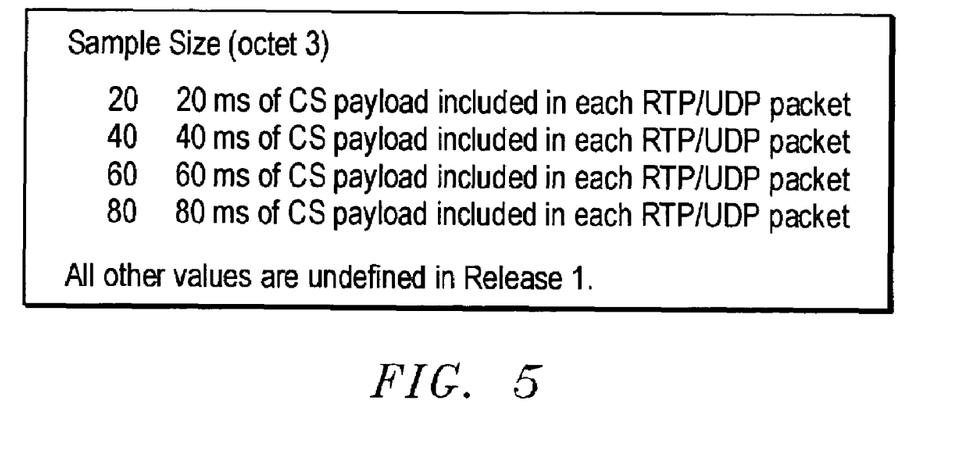
FIG. 5 is a table showing various values of Sample Size that may be selected by the MS according to the present invention.

FIG. 5 is a table showing various values of Sample Size that may be selected by the MS according to the present invention. The Sample Size may vary in 20-ms steps from 20 ms to 80 ms of CS payload included in each RTP/UDP packet.

If the MS 30 fails to establish the channel indicated in the URR ACTIVATE CHANNEL message 21, the MS transmits a URR ACTIVATE CHANNEL FAILURE message to the UNC 103 and thereafter acts as if the URR ACTIVATE CHANNEL message was not received.

The present invention changes this procedure by causing the MS to interpret the "Sample Size" IE as a minimum sample size acceptable to the network for the coding and decoding of the CS payload samples. Thus, rather than forcing the MS to use the value of the "Sample Size" IE as the sampling size for the coding and decoding of the CS payload samples, the MS has the option to accept the minimum sample size or to select a larger sample size for the connection. High performance MSs can accept the minimum sample size and thus avoid the higher round trip delay inherent in larger sample sizes. Likewise, lower performance MSs can select a larger sample size. When the UNC detects that an MS has selected a larger sample size, the UNC also begins using the larger sample size in transmissions to the MS. Thus lower performance MSs are not being precluded from channel assignment, and can proceed with the call.

Figure 6:
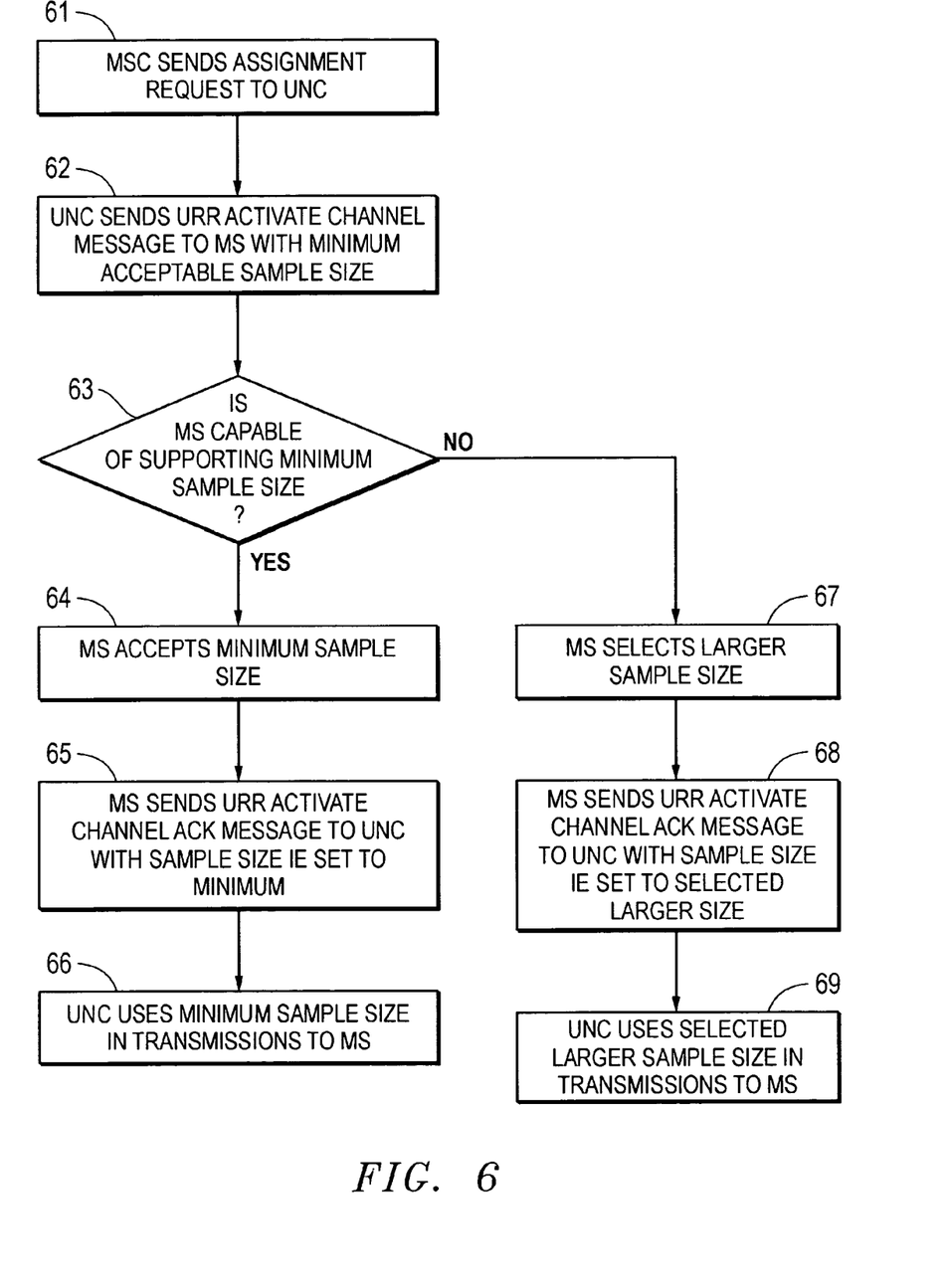
FIG. 6 is a flow chart illustrating the steps of an exemplary embodiment of the method of the present invention.

FIG. 6 is a flow chart illustrating the steps of a first exemplary embodiment of the method of the present invention. At step 61, an MSC sends an Assignment Request message to the UNC 103. At step 62, the UNC sends a URR ACTIVATE CHANNEL message to a URR-dedicated MS 30, and includes a minimum acceptable Sample Size. At step 63, the MS determines whether it is capable of supporting the minimum Sample Size included in the URR ACTIVATE CHANNEL message. If so, the MS accepts the minimum Sample Size at step 64 and sends a URR ACTIVATE CHANNEL ACK message to the UNC at step 65. The URR ACTIVATE CHANNEL ACK message includes a Sample Size IE set to the minimum Sample Size. Thereafter, at step 66, the UNC uses the minimum Sample Size in transmissions to the MS, thereby avoiding increased delay in transmissions between the MS and the network controller that would result from the use of larger Sample Sizes.

If it is determined at step 63 that the MS is not capable of supporting the minimum Sample Size included in the URR ACTIVATE CHANNEL message, the MS selects a larger Sample Size at step 67. At step 68, the MS sends a URR ACTIVATE CHANNEL ACK message to the UNC with the Sample Size IE set to the selected larger Sample Size. Thereafter, at step 69, the UNC uses the selected larger Sample Size in transmissions to the MS. In this way, less capable MSs are not precluded from channel assignment, and can proceed with the call.

Note that if the MS is capable of using the Sample Size requested by the UNC in the URR ACTIVATE CHANNEL message, it does so. The UNC may request a particular Sample Size for network reasons such as controlling the load on a heavily loaded network. If the MS cannot support the requested Sample Size, it selects a Sample Size as close to the requested Sample Size as possible.

Figure 7:
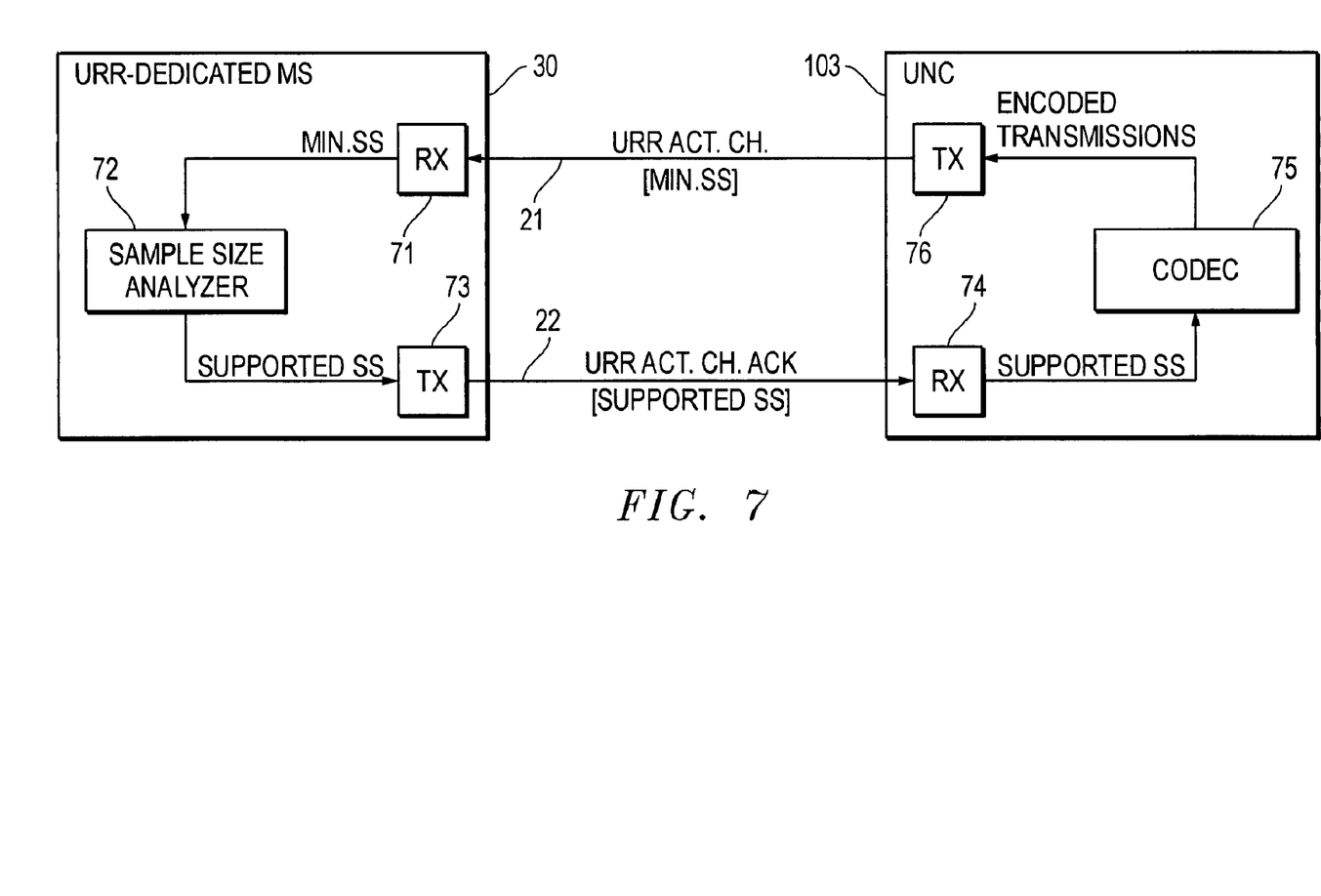
FIG. 7 is a simplified block diagram of an exemplary embodiment of the system of the present invention.

FIG. 7 is a simplified block diagram of an exemplary embodiment of the system of the present invention. The URR-dedicated MS 30 includes a receiver (RX) 71, a Sample Size Analyzer 72, and a transmitter (TX) 73. The UNC 103 includes a receiver (RX) 74, a codec 75, and a transmitter (TX) 76. The MS 30 and the UNC 103, of course, include many other components that are not shown. However, the illustrated components are sufficient to illustrate the operation of the present invention to those skilled in the art.

The UNC 103 transmits a URR ACTIVATE CHANNEL message 21 to the URR-dedicated MS 30, and includes a minimum acceptable Sample Size (Min SS). The MS RX 71 sends the Min SS to the Sample Size Analyzer 72, which determines whether the MS is capable of supporting the minimum Sample Size included in the URR ACTIVATE CHANNEL message. The Sample Size Analyzer sends the lowest Sample Size that the MS can support (Supported SS) to the MS TX 73, which sends the Supported SS to the UNC in a URR ACTIVATE CHANNEL ACK message 22. The UNC RX 74 receives the message and sends the Supported SS to the codec 75. Thereafter, the codec encodes transmissions to the MS using the Supported SS.

Figure 8:
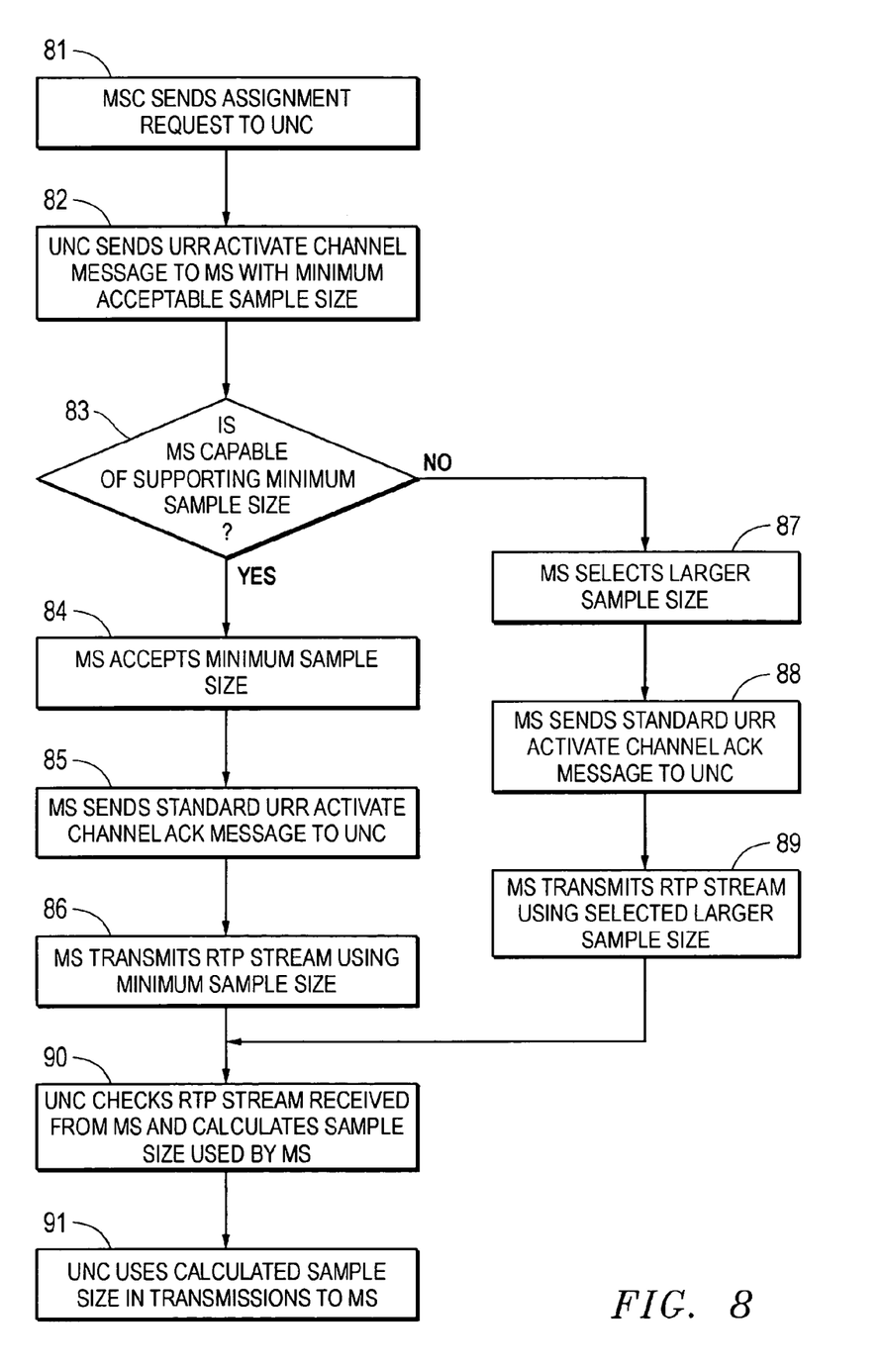
FIG. 8 is a flow chart illustrating the steps of a second exemplary embodiment of the method of the present invention.

FIG. 8 is a flow chart illustrating the steps of a second exemplary embodiment of the method of the present invention. In this embodiment, there is no change to the existing URR ACTIVATE CHANNEL ACK message (which does not include a Sample Size IE). Instead of the MS inserting a Sample Size IE in the ACK message, the MS selects a sample size and sends the existing ACK message. The MS then starts transmitting an RTP stream using the selected sample size. The UNC checks the RTP stream received from the MS and calculates the sample size being used by the MS. Thereafter, the UNC uses the calculated Sample Size in transmissions to the MS.

The process begins at step 81 where the MSC sends an Assignment Request message to the UNC 103. At step 82, the UNC sends a URR ACTIVATE CHANNEL message to the URR-dedicated MS 30, and includes a minimum acceptable Sample Size. At step 83, the MS determines whether it is capable of supporting the minimum Sample Size included in the URR ACTIVATE CHANNEL message. If so, the MS accepts the minimum Sample Size at step 84 and sends a standard URR ACTIVATE CHANNEL ACK message to the UNC at step 85. At step 86, the MS begins transmitting an RTP stream to the UNC using the minimum sample size.

However, if it is determined at step 83 that the MS is not capable of supporting the minimum Sample Size included in the URR ACTIVATE CHANNEL message, the MS selects a larger Sample Size at step 87. At step 88, the MS sends a standard URR ACTIVATE CHANNEL ACK message to the UNC. At step 89, the MS begins transmitting an RTP stream to the UNC using the selected larger sample size.

At step 90, the UNC checks the RTP stream received from the MS and calculates the sample size being utilized by the MS. Thereafter, at step 91, the UNC uses the calculated Sample Size in transmissions to the MS.

In another embodiment, if the MS is capable of using the Sample Size requested by the UNC in the URR ACTIVATE CHANNEL message, it does so. The UNC may request a particular Sample Size for network reasons such as controlling the load on a heavily loaded network. If the MS cannot support the requested Sample Size, it selects a Sample Size as close to the requested Sample Size as possible. The selected Sample Size may be larger or smaller than the requested Sample Size. For example, suppose the MS can support 2 or 3 voice samples per RTP packet. If the UNC requests 2 voice sample per RTP packet, the MS selects 2 voice samples per RTP packet. If the UNC requests 1 voice sample per RTP packet, the MS selects 2 voice samples per RTP packet because a Sample Size of 2 is the closest Sample Size to the requested Sample Size that the MS can support. Likewise, if the UNC requests 4 voice sample per RTP packet, the MS selects 3 voice samples per RTP packet because a Sample Size of 3 is the closest Sample Size to the requested Sample Size that the MS can support.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of adapting circuit-switched payload transport between a mobile station and an unlicensed-radio access network controller utilizing a packet-based transmission protocol, said method comprising the steps of:

receiving in the mobile station, a channel activation message from the access network controller, said channel activation message including a minimum acceptable sample size of the circuit-switched payload to be included in each packet;

determining whether the mobile station is capable of supporting communications utilizing the minimum acceptable sample size;

if the mobile station is capable of supporting communications utilizing the minimum acceptable sample size, sending an acknowledgment message from the mobile station to the access network controller accepting the minimum acceptable sample size as the sample size to be utilized by the controller for transmissions to the mobile station; and if the mobile station is not capable of supporting communications utilizing the minimum acceptable sample size, selecting a larger sample size which the mobile station is capable of supporting; and sending an acknowledgment message from the mobile station to the access network controller specifying the selected larger sample size as the sample size to be utilized by the controller for transmissions to the mobile station.

2. The method of claim 1, wherein the packet-based transmission protocol is the Real-Time Protocol (RTP), and the step of receiving a channel activation message in the mobile station includes receiving a URR ACTIVATE CHANNEL message, and the step of sending an acknowledgment message from the mobile station includes sending a URR ACTIVATE CHANNEL ACK message.

3. A method of adapting circuit-switched payload transport between an unlicensed-radio access network controller and a mobile station utilizing a packet-based transmission protocol, said method comprising the steps of:

sending from the access network controller to the mobile station, a channel activation message, said channel activation message including a minimum acceptable sample size of the circuit-switched payload to be included in each packet;

receiving an acknowledgment message from the mobile station, said acknowledgment message accepting the minimum acceptable sample size as the sample size to be utilized by the controller for transmissions to the mobile station if the mobile station is capable of supporting communications utilizing the minimum acceptable sample size, and said acknowledgment message specifying a larger sample size as the sample size to be utilized by the controller for transmissions to the mobile station if the mobile station is not capable of supporting communications utilizing the minimum acceptable sample size; and encoding transmissions to the mobile station utilizing the sample size received in the acknowledgment message;

wherein the packet-based transmission protocol is the Real-Time Protocol (RTP), and the step of sending a channel activation message to the mobile station includes sending a URR ACTIVATE CHANNEL message, and the step of receiving an acknowledgment message from the mobile station includes receiving a URR ACTIVATE CHANNEL ACK message.

4. A mobile station for transporting a circuit-switched payload to and from an unlicensed-radio access network controller utilizing a packet-based transmission protocol, said mobile station comprising:

a receiver that receives a channel activation message from the access network controller and extracts from the channel activation message, a minimum acceptable sample size of the circuit-switched payload to be included in each packet;

a sample size analyzer that receives the extracted minimum acceptable sample size from the receiver and determines whether the mobile station is capable of supporting communications utilizing the minimum acceptable sample size;

a transmitter that sends to the access network controller, an acknowledgment message that includes a sample size that the mobile station can support;

wherein, if the mobile station is capable of supporting communications utilizing the minimum acceptable sample size, the sample size analyzer sends an indication to the transmitter accepting the minimum acceptable sample size as the sample size to be included in the acknowledgment message; and wherein, if the mobile station is not capable of supporting communications utilizing the minimum acceptable sample size, the sample size analyzer selects a larger sample size that the mobile station can support, and sends an indication to the transmitter of the selected larger sample size as the sample size to be included in the acknowledgment message.

5. An unlicensed-radio access network controller for transporting a circuit-switched payload to and from a mobile station utilizing a packet-based transmission protocol, said access network controller comprising:

a transmitter that sends to the mobile station, a channel activation message, said channel activation message including a minimum acceptable sample size of the circuit-switched payload to be included in each packet;

a receiver that receives an acknowledgment message from the mobile station, said acknowledgment message including a sample size that the mobile station can support;

means for analyzing the acknowledgment message to determine whether the mobile station accepted the minimum acceptable sample size as the sample size to be utilized by the controller for transmissions to the mobile station, or whether the mobile station specified a larger sample size as the sample size to be utilized by the controller for transmissions to the mobile station; and a codec that encodes transmissions to the mobile station utilizing the sample size received in the acknowledgment message;

wherein the racket-based transmission protocol is the Real-Time Protocol (RTP). and the transmitter that sends the channel activation message to the mobile station sends a URR ACTIVATE CHANNEL message; and wherein the receiver that receives the acknowledgment message from the mobile station receives a URR ACTIVATE CHANNEL ACK message.

6. A method of adapting circuit-switched payload transport between a mobile station and an unlicensed-radio access network controller utilizing a packet-based transmission protocol, said method comprising the steps of:

receiving in the mobile station, a channel activation message from the access network controller, said channel activation message including a minimum acceptable sample size of the circuit-switched payload to be included in each packet;

determining whether the mobile station is capable of supporting communications utilizing the minimum acceptable sample size;

if the mobile station is capable of supporting communications utilizing the minimum acceptable sample size, transmitting packets to the controller utilizing the minimum acceptable sample size to transport the circuit-switched payload; and if the mobile station is not capable of supporting communications utilizing the minimum acceptable sample size, transmitting packets to the controller utilizing a selected larger sample size to transport the circuit-switched payload;

wherein the controller analyzes the packets received from the mobile station to determine the sample size utilized by the mobile station, and transmits packets to the mobile station utilizing the determined sample size.

7. A method of adapting circuit-switched payload transport between an unlicensed-radio access network controller and a mobile station utilizing a packet-based transmission protocol, said method comprising the steps of:

activating a channel between the controller and the mobile station for transmitting packets containing the circuit-switched payload;

determining by the controller, a minimum acceptable sample size of the circuit-switched payload to be included in each packet;

receiving in the controller, packets transmitted by the mobile station, said packets having a sample size selected by the mobile station for transporting the circuit-switched payload;

analyzing the received packets to determine the sample size utilized by the mobile station;

determining whether the sample size selected by the mobile station is equal to or greater than the minimum acceptable sample size;

denying call set up if the sample size selected by the mobile station is smaller than the minimum acceptable sample size; and encoding transmissions to the mobile station utilizing the sample size selected by the mobile station if the sample size selected by the mobile station is equal to or greater than the minimum acceptable sample size.

8. An unlicensed-radio access network controller for transporting a circuit-switched payload to and from a mobile station utilizing a packet-based transmission protocol, said access network controller comprising:

means for determining a minimum acceptable sample size of the circuit-switched payload to be included in each packet;

a transmitter that sends to the mobile station, a channel activation message, said channel activation message including the minimum acceptable sample size;

a receiver that receives packets transmitted by the mobile station, said packets utilizing a sample size selected by the mobile station;

means for analyzing the received packets to determine whether the sample size selected by the mobile station is equal to or greater than the minimum acceptable sample size; and means for denying call setup if the sample size selected by the mobile station is smaller than the minimum acceptable sample size; and a codec that encodes transmissions to the mobile station utilizing the sample size selected by the mobile station if the sample size selected by the mobile station is equal to or greater than the minimum acceptable sample size.

9. A system in an unlicensed-radio access network for transporting a circuit-switched payload utilizing a packet-based transmission protocol, said system comprising:

an unlicensed-radio access network controller comprising:
  a transmitter that sends to a mobile station, a channel activation message, said channel activation message including a minimum acceptable sample size of the circuit-switched payload to be included in each packet;
  a receiver that receives an acknowledgment message from the mobile station, said acknowledgment message including a sample size that the mobile station can support; and
  a codec that encodes transmissions to the mobile station utilizing the sample size received in the acknowledgment message; and a mobile station comprising:
  a receiver that receives the channel activation message from the access network controller and extracts from the channel activation message, the minimum acceptable sample size;
  a sample size analyzer that receives the extracted minimum acceptable sample size from the receiver and if the mobile station is not capable of supporting communications utilizing the minimum acceptable sample size, selects a larger sample size that the mobile station can support; and
  a transmitter that sends to the access network controller, an acknowledgment message that includes a sample size that the mobile station can support.

10. A method of adapting circuit-switched payload transport between a mobile station and an unlicensed-radio access network controller utilizing a packet-based transmission protocol, said method comprising the steps of:

receiving in the mobile station, a channel activation message from the access network controller, said channel activation message including a requested sample size of the circuit-switched payload to be included in each packet;

determining whether the mobile station is capable of supporting communications utilizing the requested sample size;

if the mobile station is capable of supporting communications utilizing the requested sample size, transmitting packets to the controller utilizing the requested sample size to transport the circuit-switched payload; and if the mobile station is not capable of supporting communications utilizing the requested sample size, transmitting packets to the controller utilizing a selected sample size supported by the mobile station;

wherein the controller analyzes the packets received from the mobile station to determine the sample size utilized by the mobile station, and transmits packets to the mobile station utilizing the determined sample size.

11. The method of claim 10, wherein the step of transmitting packets to the controller utilizing a selected sample size supported by the mobile station includes selecting a sample size, from the sample sizes supported by the mobile station, which is closest in size to the requested sample size.

12. The method of claim 10, wherein the step of transmitting packets to the controller utilizing a selected sample size supported by the mobile station includes selecting a sample size which is larger than the requested sample size if the mobile station supports a larger sample size.

13. The method of claim 12, wherein the step of transmitting packets to the controller utilizing a selected sample size supported by the mobile station includes selecting a sample size which is smaller than the requested sample size if the mobile station does not support a larger sample size.

* * * * *